US012638983B2

(12) United States Patent
Sforzin et al.

(10) Patent No.: US 12,638,983 B2
(45) Date of Patent: May 26, 2026

(54) PROVIDING MULTIPLE ERROR CORRECTION CODE PROTECTION LEVELS IN MEMORY

(71) Applicant: Micron Technology, Inc., Boise, ID (US)

(72) Inventors: Marco Sforzin, Cernusco sul Naviglio (IT); Christophe Vincent Antoine Laurent, Agrate Brianza (IT); Riccardo Muzzetto, Arcore (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/772,553

(22) Filed: Jul. 15, 2024

(65) Prior Publication Data

US 2024/0370186 A1 Nov. 7, 2024

Related U.S. Application Data

(63) Continuation of application No. 17/952,614, filed on Sep. 26, 2022, now Pat. No. 12,039,176.

(51) Int. Cl.
G06F 3/06 (2006.01)
(52) U.S. Cl.
CPC .......... G06F 3/0625 (2013.01); G06F 3/0629 (2013.01); G06F 3/0679 (2013.01)
(58) Field of Classification Search
CPC .... G06F 3/0625; G06F 3/0629; G06F 3/0679; G06F 11/1048
See application file for complete search history.

(56) References Cited

U.S. PATENT DOCUMENTS

| | | | |
|---|---|---|---|
| 9,214,964 B1 * | 12/2015 | Varnica | H03M 13/1102 |
| 10,063,256 B1 | 8/2018 | Henriksen | |
| 11,581,906 B1 * | 2/2023 | Berman | H03M 13/2918 |
| 2006/0123314 A1 * | 6/2006 | Kim | H03M 13/11 |
| | | | 714/758 |
| 2016/0134392 A1 | 5/2016 | Effenberger | |
| 2017/0111061 A1 | 4/2017 | Ish-Shalom | |
| 2020/0127684 A1 | 4/2020 | Park | |
| 2020/0312260 A1 * | 10/2020 | Kim | G09G 3/3696 |
| 2021/0089398 A1 | 3/2021 | Gurumurthi | |

(Continued)

FOREIGN PATENT DOCUMENTS

| | | |
|---|---|---|
| WO | 2022185088 A1 | 9/2022 |
| WO | 2022185089 A1 | 9/2022 |

(Continued)

*Primary Examiner* — Nanci N Wong
(74) *Attorney, Agent, or Firm* — Brooks, Cameron & Huebsch, PLLC

(57) ABSTRACT

The present disclosure relates to providing multiple error correction code protection levels in memory. One device includes an array of memory cells and an operating circuit for managing operation of the array. The operating circuit comprises an encoding unit configured to generate a codeword for a first error correction code (ECC) protection level and a second ECC protection level, and decoding unit configured to perform an ECC operation on the codeword at the first ECC protection level and the second ECC protection level. The codeword comprises payload data stored in a plurality of memory cells of the array, and parity data associated with the payload data stored in parity cells of the array.

18 Claims, 7 Drawing Sheets

(56) References Cited

U.S. PATENT DOCUMENTS

| 2021/0111740 A1* | 4/2021 | Nammi | H03M 13/251 |
| 2021/0119647 A1 | 4/2021 | Lee | |
| 2022/0068423 A1 | 3/2022 | Yang | |
| 2023/0106125 A1* | 4/2023 | Chung | H03M 13/353 |
| | | | 714/764 |
| 2023/0112694 A1 | 4/2023 | Oh | |

FOREIGN PATENT DOCUMENTS

| WO | 2022185090 A1 | 9/2022 |
| WO | 2022185091 A1 | 9/2022 |

* cited by examiner

PROVIDING MULTIPLE ERROR CORRECTION CODE PROTECTION LEVELS IN MEMORY

PRIORITY INFORMATION

This application is a Continuation of U.S. application Ser. No. 17/952,614, filed on Sep. 26, 2022, the contents of which are incorporated herein by reference.

TECHNICAL FIELD

The present disclosure relates generally to the management and operation of an array of memory cells, and more particularly to providing multiple error correction code protection levels in memory.

BACKGROUND

Memory devices are used in many electronic systems such as mobile phones, personal digital assistants, laptop computers, digital cameras and the like. Various types of memories are used in memory devices, including random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Nonvolatile memories retain their contents when power is switched off, making them good choices in memory devices for storing information that is to be retrieved after a system power-cycle. In particular, non-volatile memory cells may maintain their stored logic state for extended periods of time even in the absence of an external power source.

The information is stored by programming different states of a memory device. For example, binary devices have two states, often denoted by a logic "1" or a logic "0." In other systems, more than two states may be stored. In order to access the stored information, a component of the memory device may read, or sense, the stored state. In order to store the information, a component of the memory device may write, or program, the logic state.

Improving memory devices may include increasing memory cell density, increasing read/write speed, increasing reliability, increasing data retention, reducing manufacturing costs, scaling smaller than traditional devices, as well as reducing power consumption.

Memory cells have varying physical and electrical characteristics during their life cycle due to various factors such as number of accesses, quality of the manufacturing process, environmental factors, and the like. Error Correction Code (ECC) is usually calibrated on a defined status of the cells of the memory device (e.g., end-of-life reliability of the cells), and therefore is generally used at its highest correction power. Consequently, there is often an excessive power consumption in memory devices. It is thus desirable to improve power consumption performances over the entire life of the memory device.

DETAILED DESCRIPTION

Figure 1:
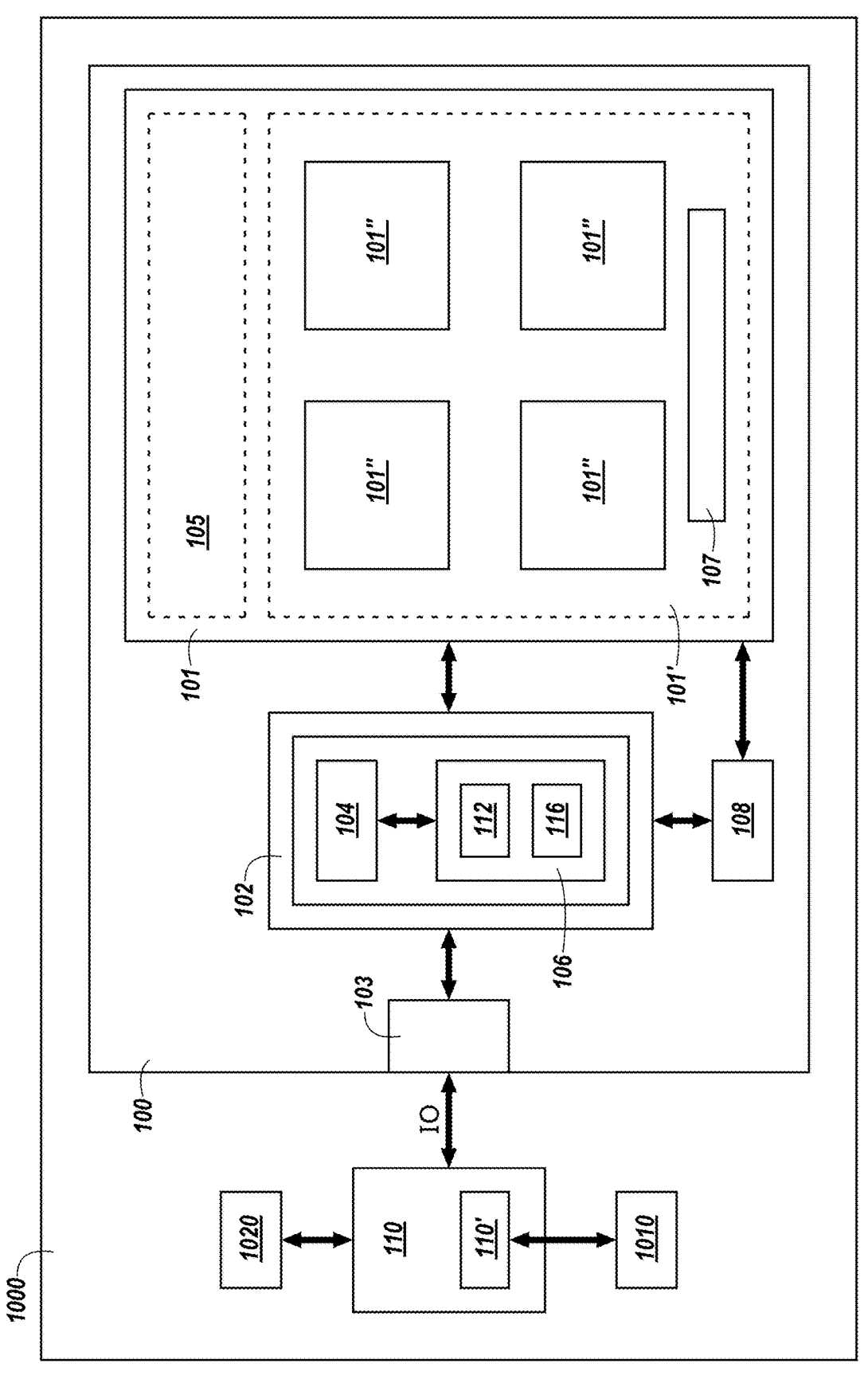
FIG. 1 is a schematic block diagram of a system comprising a memory device that may be operated according to an embodiment the present disclosure.

The present disclosure relates to providing multiple error correction code protection levels in memory. One device includes an array of memory cells and an operating circuit for managing operation of the array. The operating circuit comprises an encoding unit configured to generate a codeword for a first error correction code (ECC) protection level and a second ECC protection level, and decoding unit configured to perform an ECC operation on the codeword at the first ECC protection level and the second ECC protection level. The codeword comprises payload data stored in a plurality of memory cells of the array, and parity data associated with the payload data stored in parity cells of the array.

Nonvolatile memories retain their contents when power is switched off, making them good choices for storing information that is to be retrieved after a system power-cycle. A Flash memory is a type of nonvolatile memory that retains stored data and is characterized by a very fast access time. Moreover, it can be erased in blocks instead of one byte at a time. Each erasable block of memory comprises a plurality of nonvolatile memory cells arranged in a matrix of rows and columns. Each cell is coupled to an access line and/or a data line. The cells are programmed and erased by manipulating the voltages on the access and data lines. Access circuitry can differentiate between different logic states of a memory cell. For example, in case of a memory read, the access circuitry applies a voltage pulse with a particular magnitude and polarity to access lines, which results in an electrical response that dedicated sense circuitry can detect. Detecting electrical responses can include, for example, detecting one or more of a voltage drop (e.g., a threshold voltage) across terminals of a given memory cell of the array, current through the given memory cell, and a threshold event of the given memory cell.

Memory cells (e.g., flash memory cells) can have varying physical and electrical characteristics during their life cycle due to various factors such as number of accesses, quality of the manufacturing process, environmental factors, and the like. Error Correction Code (ECC) can be used to correct errors in the memory cells that may occur as a result of these varying characteristics. In previous approaches, ECC may be calibrated based on a defined status of the memory cells (e.g., end-of-life reliability of the cells), and therefore is generally used at a single protection level (e.g., the highest possible correction power). Consequently, there is often an excessive power consumption in previous memory devices.

Embodiments of the present disclosure, however, can utilize ECC circuitry (e.g., an encoder and a decoder) that can operate at multiple correction levels. For instance, ECC circuitry in accordance with the present disclosure can operate at both the highest correction power available, and at a lower correction power (e.g., when the highest correction power is not needed). Further, embodiments of the present disclosure can ensure that the payload data for each of the correction levels is the greatest possible quantity of payload data compatible with that respective correction level. As such, embodiments of the present disclosure can improve power consumption performances and storage capacity over the entire life of the memory.

In the present disclosure, the term "coupled" can refer to elements that are physically, electrically, and/or communicatively connected either directly or indirectly, and may be used interchangeably with the term "connected" herein. Physical coupling can include direct contact. Electrical coupling includes an interface or interconnection that allows electrical flow and/or signaling between components. Communicative coupling includes connections, including wired and wireless connections, that enable components to exchange data.

As used herein, "a", "an", or "a number of" can refer to one or more of something, and "a plurality of" can refer to two or more such things. For example, a memory device can refer to one or more memory devices, and a plurality of memory devices can refer to two or more memory devices.

FIG. 1 is a schematic high-level block diagram of a system 1000 comprising a memory device 100 according to an exemplary embodiment of the present disclosure, this memory device 100 being arranged, programmed and configured to perform the ECC techniques disclosed below and having dedicated ECC circuit portions.

The memory device 100 can be a solid-state drive (SSD), for instance, and can include a memory section 101, a controller 102, and a host interface 103. The memory section 101 is not limited to a particular architecture and can include different types of memories.

The controller 102 may be coupled to the host interface 103 and to the memory section 101 via a plurality of channels and can be used to transfer data between the memory section 101 and a host 110. The host interface 103 can be in the form of a standardized interface. For example, when the memory device 100 is used for data storage in a computing system, the host interface 103 can be a serial advanced technology attachment (SATA), peripheral component interconnect express (PCIe), or a universal serial bus (USB), among other connectors and interfaces. In general, the host interface 103 can provide an interface for passing control, address, data, and other signals between the memory device 100 and the host 110.

The controller 102 can include an embedded firmware and is adapted to internally manage and control the operation of the memory section 101. The controller 102 can communicate with the memory section 101 to control data read, write, and erase operations, among other operations. For example, the controller 102 can include a number of components in the form of hardware and/or firmware (e.g., one or more integrated circuits) and/or software for controlling access to the memory section 101 and/or for facilitating data transfer between the host 110 and said memory section 101.

The memory controller 102 thus represents control logic of the device, for example acting in response to command by the host 110 (which may generally be an external managing system of the non-volatile memory). In one embodiment, the memory controller 102 can also be implemented in the host 110, in particular as part of a host processor 110', even if the present disclosure is not limited by a particular architecture.

As disclosed in relation to FIG. 1, the memory controller 102 may receive user data through input/output IO. Multiple signal lines couple the memory controller 102 with the memory section 101. For example, such signal lines may include clock, command/address and write data (DQ), read DQ, and zero or more other signal lines. The memory controller 102 may thus be operatively coupled to the memory section 101 via suitable buses.

The memory device 100 can also comprise other components (not shown) such as processor units coupled to the controller 102, antennas, further connection means with the host device 110, and the like. In any case, the present disclosure is not limited by a specific configuration of the memory device 100.

Moreover, the controller 102 can also include its own memory section (not shown) operatively coupled with other units thereof. In any case, the present disclosure is not limited by a particular configuration of the controller 102.

The memory device 100 may be a portable device configured to be coupled to the host device 110. However, in other embodiments not shown in the drawings, the memory device 100 can also be embedded within one or more host devices. The host 110 may be for example a personal computer, a tablet, a smartphone, a server or the like. The host 110 can include a system motherboard and/or backplane and can include a number of memory access devices (e.g., a number of processors).

In an embodiment, the controller 102 includes an Error Correction Code (ECC) unit 104, also referred to as ECC engine, which is structured and configured to operate according to techniques as described in the following.

The ECC unit 104 can include error correction circuitry and logics to detect and correct a number of bit errors, according to embodiments of the present disclosure. The ECC unit 104 is not limited to circuitry (e.g., hardware) implementations. For instance, in addition, the ECC unit 104 can be implemented in firmware, and/or software.

The ECC unit 104 can be embodied by discrete components such as an application specific integrated circuit (ASIC) or by components that reflect functionally provided by circuitry within the controller 102 that does not necessarily have a discrete physical form separate from other portions of the controller 102. Although illustrated as components within the controller 102, the ECC unit 104 can be external to the controller 102 or can have a number of components located within the controller 102 and a number of components located external to the controller 102, wherein the present disclosure is not limited by a specific hardware architecture. The ECC unit 104 can include separate encoding and decoding components, in a number of embodiments, as will be further described herein. In general, the memory device 100 thus comprises an operating unit (or operating circuit), indicated as 104, which is an ECC engine (which in turn may be coupled to the controller 102).

In other words, the error detection/correction circuitry of the ECC unit 104, which may be programmed as disclosed below, can include hardware logic to implement an ECC to detect errors occurring in data read from memory section 101. In one embodiment, error detection/correction circuitry also corrects errors (up to a certain error rate based on the implemented ECC code).

The memory section 101 of the memory device 100 can be a flash memory including an array of memory cells, for example a NAND memory, NOR memory, AND memory, and the like. Additionally or alternatively, memory section 101 may comprise bit alterable memory cells; for example, Phase Change Memory (PCM), Ferroelectric Memory (Fe-RAM), Magnetic Memory (MRAM), chalcogenide-based Self Selecting Memory (SSM), etc. Any kind of memory may be employed in embodiments of the present disclosure.

For example, the disclosure applies to either or both non-volatile and volatile memories.

In general, the memory section 101 may comprise an array of memory cells 101'. Non-volatile memories may comprise a plurality of blocks, each block being indicated herein with the reference number 101" and comprising a defined number of pages. For the sake of simplicity, only four blocks 101" are shown in the example of FIG. 1.

The memory section 101 represents the memory resource for the memory device 100. In one embodiment, the array of memory cells 101' is managed as rows of data, accessed via wordline (rows) and bitline (individual bits within a row) control. The array of memory cells 101' can be organized as separate channels, ranks, and banks of memory, in general in a plurality of portions. Channels are independent control paths to storage locations within memory section. Ranks refer to common locations across multiple memory devices (e.g., same row addresses within different devices). Banks refer to arrays of memory locations within a memory device. In one embodiment, banks of memory are divided into sub-banks with at least a portion of shared circuitry (e.g., drivers, signal lines, control logic) for the sub-banks. It will be understood that channels, ranks, banks, or other organizations of the memory locations, and combinations of the organizations, can overlap physical resources. For example, the same physical memory locations can be accessed over a specific channel as a specific bank, which can also belong to a rank. Thus, the organization of memory resources will be understood in an inclusive, rather than exclusive, manner.

In other words, according to an embodiment of the present disclosure, the array of memory cells 100' may be subdivided into a plurality portions, such as a codeword, a page, a single block, a group of blocks, or even all blocks (e.g., all the cells), the present disclosure not being limited thereto. The memory cells can thus be grouped, for instance, into a number of blocks including a number of physical pages. A number of blocks can be included in a plane of memory cells and an array can include a number of planes.

Embodiments are not limited to a particular type of memory array or array architecture and the techniques of the present disclosure may be applied to several memory technologies (e.g., planar, cross-point, 3D, etc.).

Memory section 101 may also comprise a further circuit 105 operatively coupled to the array of memory cells 101'.

In one embodiment, the circuit 105 includes access circuitry and sense circuitry to detect electrical responses of the one or more memory cells to an applied read voltage. In one embodiment, the sense circuitry includes sense amplifiers. FIG. 1 illustrates the circuit 105 as being embedded in the memory section 101; however, other embodiments can include access circuitry and/or sense circuitry that is separate from the memory section 101. For example, access circuitry and sense circuitry can be included in a memory controller such as the memory controller 102.

Furthermore, the memory device 100 may comprise a counting unit 106 configured to account for the status of the memory cells of the array of memory cells 101' and for determining a trigger event to activate the ECC unit 104.

More in particular, the counting unit 106 may comprise a first counter 112 and a second counter 116. The first counter 12 may be configured to account for the lifetime of the array of memory cells 101' (or of portions thereof). For example, the first counter 112 may be apt to count the number of accesses, or the number of refresh events, or the number of power-up events, or a combination thereof, in accordance with embodiments disclosed below. The second counter 116 may be configured to count the number of errors detected by the ECC unit 104.

In the example of FIG. 1, the counting unit 106 is depicted as integrated into the controller 102, even if other architectures are possible and the counting unit 106 may also be external to the controller 102 and connected thereto, or it may be integrated in the ECC unit 104.

Furthermore, the memory device 100, in particular the array of memory cells 101' of the memory section 101, may comprise a non-volatile region 107 apt to store operating information, for example for the management of the memory array according to embodiments disclosed in the following.

In one embodiment, the memory device 100 may also comprise a sensing unit 108 comprising one or more sensors operatively coupled to the memory section 101 and optionally to the controller 102. The sensing unit 108 may be configured to detect a status (e.g., the temperature) of the array of memory cells 101' or of a portion thereof.

Generally, the particular architecture of the memory device 100 may vary according to the needs and/or circumstances without limiting the scope of the present disclosure.

The host 110 and the memory device 100 may form the system 1000. As mentioned before, the host device 110 is a computing device in accordance with any embodiment described herein, and can be a laptop computer, a desktop computer, a server, a gaming or entertainment control system, a scanner, copier, printer, routing or switching device, embedded computing device, or other electronic device such as a smartphone. The host 110 may generally be a system managing the memory section 101, which may be embedded in said system or generally managed by said system. The memory device 100 may thus be managed by an external controller, e.g., the controller embedded in the processor 110' of the host 110, as previously disclosed, so that the ECC unit may also be included in said external controller. In this case, the controller of the memory device may not be present and the memory device 100 (which may be embedded in the host 110) communicates the required information to the external controller.

In one embodiment, the system 1000 includes an interface 1010 coupled to the processor 110', which can represent a higher speed interface or a high throughput interface for system components that needs higher bandwidth connections, and/or graphics interface components. Graphics interface interfaces to graphics components for providing a visual display to a user of system 1000. In one embodiment, graphics interface generates a display based on data stored in the memory device or based on operations executed by processor or both.

The system may also comprise network interface 1020 communicatively coupled to the host or to memory device for example for connecting with other systems, and/or a battery coupled to provide power to said system.

According to the present disclosure, the ECC unit 104 may be configured to perform (e.g., may be capable of performing) ECC operations (detection and/or correction of errors) with multiple error correction capabilities (e.g., at a first protection level and a second protection level) on a codeword stored in the memory section 101, wherein the codeword includes a certain number of parity cells or bits, as it will be disclosed in the following. The ECC capability may vary dynamically with time for a given memory portion, requiring a correspondingly varying number of selected parity cells between a minimum and a maximum (respectively associated to a smallest and a largest ECC capability for the stored payload). Payload may be stored in at least part of the parity cells which are not selected to store parity data, e.g., in unused parity cells. That is, unused parity cells may be used for storing extra payload. At ECC capability changes (e.g., when the correction capability changes from the first protection level to the second protection level, or vice versa), possibly triggered based on a varied status of memory cells, unused parity cells and parity memory cells are made available for storing ECC information and the payload stored therein may be relocated.

Figures 2, 3:
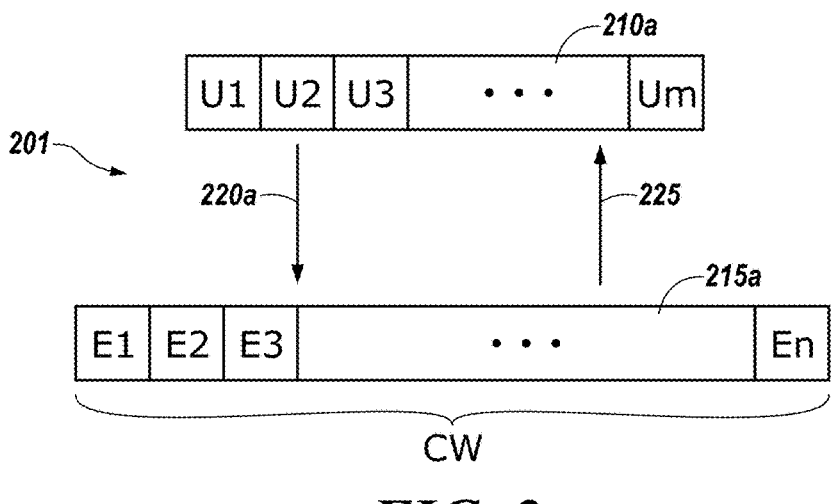
FIG. 2 is an example of user data pattern encoded according to an embodiment of the present disclosure.
FIG. 3 shows examples of selection of a number of parity cells and payload quantity in a codeword according to an embodiment of the present disclosure.

FIG. 2 illustrates an exemplary user data pattern diagram 201. The user data pattern diagram 201 includes user data 210*a* and encoded user data 215*a*. Encoding process 220*a*, which is performed in the programming phase of the array of memory cells, may convert the user data 210*a* (U1, . . . , Um) into the encoded user data 215*a* (E1, . . . , En). The encoded user data 215*a* may be stored in a set of memory cells, which may be, for example, memory cells of the memory section 101 of FIG. 1. Each box of the encoded user data 215*a* may correspond to a memory cell that may exhibit a logic state of 1 or a logic state of 0. In embodiments of the present disclosure, during the encoding process 220*a*, a number of parity bits may be added to the user data (or payload) 210*a*. A number of bits in the encoded user data 215*a* may be greater than the number of bits in the user data 210*a* (e.g., n is larger than m if some bits, e.g., parity bits, are added). Process 225 may convert the encoded user data 215*a* back to the user data 210*a* after the encoded user data 215*a* have been accurately read.

In an embodiment, the plurality of encoded bits to be read represents a codeword (CW). The codeword may be programmed to include various information to be used during the reading phase. In order to keep a smooth and simple description, in the following, reference will be made to ECC-related information only. It is understood that the additional bits may also include not strictly ECC-related information, though. Examples may include encryption bits, scrambling bits, bits for balanced or quasi-balanced codes (e.g., to achieve a predefined percentage, or within a percentage range, of bits in a given logic state, such as 50% of 1s or 0s), and/or other purpose additional bits.

As mentioned before, when digital data are stored in non-volatile memory (such as the array of memory cells 101' of FIG. 1), data are encoded in such a way that a decoder can identify and correct errors, e.g., data strings are encoded by adding a number of parity bits. When the original data is to be reconstructed, the decoder examines the encoded message to check for any errors. In certain embodiments, a block of user data bits is encoded to become a block of n bits (e.g., the codeword CW), as shown in FIG. 2. However, various encoding schemes are possible.

During the lifetime of the memory array, the Bit Error Rate (BER) associated with the data stored in the memory cells evolves based on several factors, such as, for example, a number of accesses to the memory cells, process quality, environment (space, power supply voltage, operating and storage temperature, etc.), and the like. For some technologies, the BER is typically better at the beginning of the die life and worst at the end of life, while, for some others, the BER could be better after some cycles than at the beginning and at the end of life of the die.

The present disclosure provides devices and systems to tailor the evolution of the BER and to enable a lower ECC protection when the BER is low and to increase said protection when the BER is higher. For instance, the present disclosure provides ECC circuitry having multiple ECC correction capabilities (e.g., capable of operating at multiple ECC protection levels), and examples of system architecture and design to manage the abovementioned ECC operation. In the context of the present disclosure, the "status" of a cell is meant as its operating condition or generally its health. As mentioned above, often the status of a memory cell or a plurality of memory cells may depend on several present and past parameters. The principles of the present disclosure may be applied to several types of volatile or non-volatile memories which show a time-varying status of their memory cells.

On the basis of the encoding scheme, a codeword is generated (e.g., as in process 220*a*) manipulating the user data bits and adding a number of parity bits, the number of added parity bits depending on the ECC correction capability (the more potential errors are to be detected and corrected, the more parity bits are necessary). The ECC unit 104 may be capable of operating at multiple ECC protection levels, and can generate the codeword according to a selected ECC level. According to the disclosure, the ECC correction level and the number of additional parity bits (that are intrinsically tied) may vary in operation (and thus the used number of parity cells may vary in operation). When errors are detected, the ECC unit 104 is able to correct said errors up to and according to the selected correction capability.

The number of used parity bits and the ECC correction capability are, therefore, intrinsically tied to each other. When programming a data into memory, the desired level of ECC protection (correction capability) can be selected and a corresponding number of parity bit cells allocated for storing the parity information can thus be selected. Unused parity cells may be allocated for (additional, e.g., extra) payload storage. According to some embodiments, payload may be increased when a lower ECC capability is used. When ECC capability is possibly increased, for example based on an increase of cells' aging or failure rate, the memory cells for storing the more parity bits needed are reclaimed and the payload stored therein may be relocated.

At read back, the codeword (e.g., including user codeword data, additional or extra payload data stored in unused parity bit cells, and parity bits used during the encoding phase) is accessed and decoded according to the ECC scheme applicable to that memory portion. An ECC engine (implemented in hardware, for example) with a given maximum correction capability may be capable of operating at different correction capabilities each requiring a corresponding number of parity bits. For example, less or more parity bits may be considered either in encoding or decoding for a lower or higher ECC protection level, respectively; correspondingly, a smaller or higher power is consumed.

Referring now to FIG. 3, according to an embodiment of the present disclosure, the ECC protection level is selectable according to the status of the cells of the memory array. For instance, the ECC protection is adapted to the memory cell health and is increased only when necessary, e.g., when the status of the cells requires it.

As shown before, when user data (e.g., the payload content of a codeword) are stored in a plurality of memory cells of the memory array, also parity data are stored in parity cells of the memory array associated with the user data. The number of used parity cells is selected based on the status of the plurality of memory cells, this selected number being related to the required ECC protection level, e.g., the desired or selected ECC correction capability. The ECC operation is then performed based on the selected number of parity cells, e.g., on the basis of the stored parity bits, which may vary according to the cell health.

More in particular, the used parity cells (e.g., the stored parity bits) are selected between a defined maximum number and a defined minimum number, so that the number of unused parity cells is given by the difference between the maximum defined number and the used number of parity cells. According to an embodiment, the unused parity cells (which are adapted to store parity bits corresponding to higher ECC protection levels) are used to store extra payload content.

In other words, when the payload is stored, parity data are associated with the payload. For instance, a minimum number of parity cells to be used is defined, the minimum number of parity cells corresponding to the minimum ECC correction capability, and a maximum number of parity cells to be used is defined, the maximum number of parity cells corresponding to the maximum ECC correction capability. Memory cells that are not selected to store parity data (e.g., unselected parity data memory cells) are instead used for storing, at least in part, the payload; accordingly, more storage capability is provided.

As shown in FIG. 3, a codeword may comprise a first codeword portion 301 corresponding to the payload (thus including encoded user data), and a second codeword portion 302 corresponding to the parity data. It is noted that such a distinction may be somehow arbitrary; as a matter of fact, an encoding process (such as process 220a in FIG. 2) may combine and mix the user data and the parity data so that the codeword as a whole should be considered.

When a minimum ECC protection level is needed, only a reduced number of parity cells may be used, as in codeword 300a where only the cells indicated as $P_0$ are used to store parity bits. These parity bits may correspond to ECC1, wherein ECC1 may be an error correction code with correction capability of 1 bit, in some examples.

When ECC protection has to be increased (e.g., to a maximum level), an increased number of parity cells may be used, as in codeword 300b, where an increased number of parity bits ($P_0$ and $P_1$) is stored (e.g., corresponding to ECC2, wherein ECC2 may be an error correction code with correction capability of 2 bits, in some examples).

It is observed that a single block of the codeword portion 302 does not necessarily correspond to a single cell and may also correspond to a group of cells, e.g., it generally represents the number of bits to calculate the syndrome for a corresponding ECC protection level. It should be understood that, while two levels of protection are depicted in FIG. 3 (e.g., ECC1 and ECC2), any number may be conceived. For example, embodiments with higher (e.g., N>2) error correction capability and/or embodiments featuring no ECC protection at all (e.g., no parity bit added to the codeword for the purpose of error correcting it) are possible.

The reduction of the ECC protection level to the minimum necessary thus corresponds to the reduction of the number of used parity cells.

The present disclosure provides devices and systems to tailor the evolution of the BER and to enable a lower ECC protection when the BER is low and to increase said protection when the BER is higher and storing (additional, e.g., extra) payload in unused parity memory cells. For example, the disclosure teaches ECC circuitry (e.g., an encoder and a decoder) that can operate at multiple correction levels. For instance, ECC circuitry in accordance with the present disclosure can operate at both the highest correction power available, and at a lower correction power (e.g., when the highest correction power is not needed). The operation of the ECC circuitry will be further described herein.

The ECC correction capability may be dynamically changed during the lifetime of the device; the ECC circuitry can encode, decode and error correct the codeword according to the desired and needed ECC capability. Correspondingly, the number of used parity cells can be changed so as to allow the ECC engine to work at the desired level. The number of stored payload bits can also be dynamically changed.

As an example, in some cases, at the start of life of the array, ECC1 may be used and, at end of life, ECC2 may be used (and therefore an increased number of parity cells may be used). However, also different cases are possible, including cases in which at the start of life a maximum ECC protection level is needed and after some cycles (e.g. after seasoning or in general after usage of memory cells), the ECC protection level may be reduced.

As shown in the left portion of FIG. 3, the number of unselected (unused) parity cells of codeword portion 302 is given by difference between the maximum number of parity cells to be used and the actual used number (e.g., $P_0$ in 300a, and $P_0$ and $P_1$ in 300b). As shown in the right portion of FIG. 3, payload may then be stored in at least part of the parity cells which are not selected (e.g., used) to store parity data. In this way, the stored payload content is dynamically adapted in a codeword according to the selected number of parity cells, e.g., based on the selected ECC protection. The dimension of the codeword portion 301 thus varies according to the selected ECC protection level, in particular within a fixed length page.

As shown in FIG. 3, if the ECC parity bits are stored in a reduced number of parity cells, e.g., when low ECC protection level is needed (as in codeword 300a where only parity cells $P_0$ are used), the payload can be larger, e.g., a group of cells indicated as Do can be used for storing extra payload content. Moreover, if the ECC protection level is increased (e.g., to the maximum), as in codeword 300b, all the parity cells are used for storing parity bits and the payload content is minimum (e.g., codeword portions 301 of left and right sides of FIG. 3 have a same length). In this way, some parity cells are actually used as parity when a higher ECC protection level is required and as payload when lower ECC protection level is selected. Therefore, according to the present disclosure, when bits are stored in the memory cells forming a codeword, such codeword may exhibit a dynamic payload varying during die life, as the number of parity bits varies according to the selected ECC protection level.

For example, a maximum number of memory cells for storing the payload is used when the selected number of parity cells to be used is the minimum, and a minimum number of memory cells for storing the payload is used when the selected number of parity cells to be used is the maximum. In an embodiment, all the parity cells which are not used to store parity data are used to store extra payload content. However, in other embodiments, the memory may be programmed in such a way that the payload is stored only in a part of the unused parity cells.

The storage of extra payload content in unused parity cells has many benefits, since said unused cells are a cost in terms of area of the memory. The average available payload may be optimized according to the required reliability and is higher along the die life, as well as average read/write, refresh and wear levelling throughput are higher. The dynamic payload allows obtaining a time-changing available space for data storage in the device, with increased average memory capacity during lifetime. Moreover, the dynamic payload also leads to a power reduction due to the possibility to access fewer pages and to the possibility of using smaller ECC decoder, as well as to a possible delay reduction in buffer filling.

Furthermore, different portions of the array of memory cells may have a different status and/or may exhibit different defect densities. According to an embodiment of the present disclosure, the memory cells of the array may be grouped into a plurality of portions, each portion being assigned a specific ECC protection level based on the status of the memory cells thereof. Different portions may thus have different ECC protection levels as well as a same protection level, depending on the specific circumstances. A "portion" of the array is therefore a group of memory cells having the same ECC protection level. In other words, the array may be split into portions in which the ECC correction capability is coherent but could be different from the ECC correction capability of another portion.

According to an embodiment, a memory portion may correspond to an internal subdivision like a bank group, a bank, a section or whatever other suitable internal subdivision of the memory. Moreover, the memory portion may also correspond to a specification/host subdivision like a buffer, a page, e.g., a subdivision at high level. In an embodiment, the whole memory array may be coherent in term of ECC correction capability.

In other words, a portion may correspond to one of a codeword, a bank, a bank group, a section of the array, the entire array, or even a buffer, a page, or a codeword, and the present disclosure is not limited by the way the cells are grouped.

The subdivision of the array into several portions, possibly having different ECC protection levels, is better suited to real memory devices and has many benefits.

According to embodiments of the present disclosure, a memory device configured to handle codewords having different payload quantities, having different ECC protection levels, and/or having a same overall length is provided.

Figure 4:
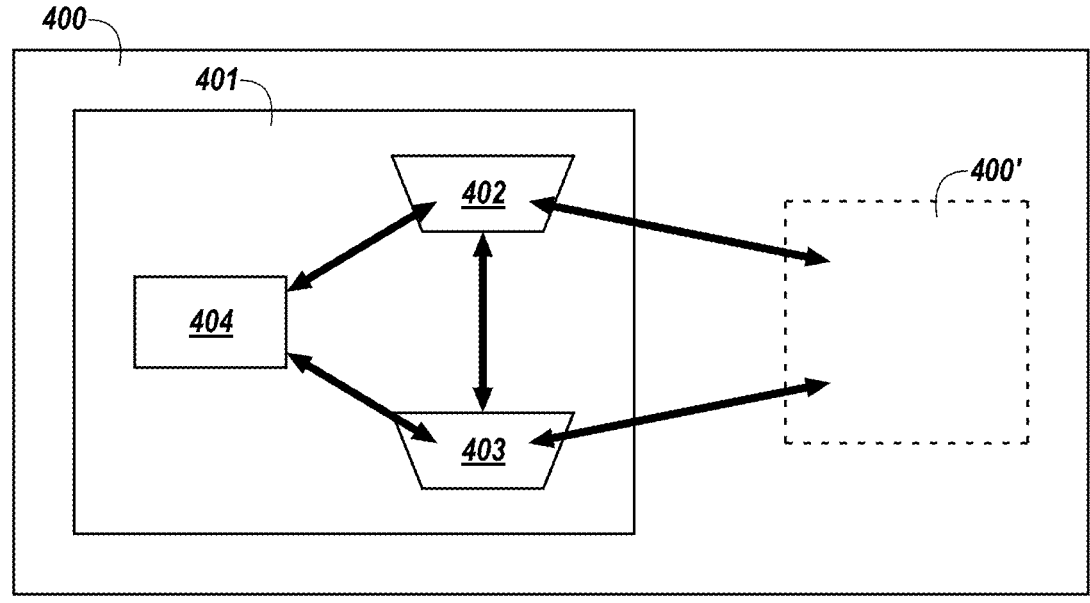
FIG. 4 is a schematic block diagram of an operating circuit for managing ECC operation according to an embodiment of the present disclosure.

As shown in FIG. 4, a memory device 400 (which may correspond to memory device 100 of FIG. 1) comprises an operating circuit 401 for managing the operation of an array of memory cells 400', which may correspond to array 101' of FIG. 1. The operating circuit 401 may be part of a controller of the device, such as controller 102 of FIG. 1, or may be external to the controller, or can have a number of components located within the controller and a number of components located external to the controller, wherein the present disclosure is not limited by a specific hardware architecture.

The operating circuit 401 (which may correspond to ECC unit 104 of FIG. 1) can include error correction circuitry and logics to detect and correct a number of bit errors (up to a certain error rate based on the implemented ECC code), according to embodiments of the present disclosure. The operating circuit 401 can be embodied by discrete components such as an application specific integrated circuit or by components that reflect functionally provided by circuitry within the controller that does not necessarily have a discrete physical form separate from other portions of the controller. Therefore, in the present disclosure, the term "operating circuit" is used in a general and nonlimiting way.

The operating circuit 401 can include separate encoding and decoding components, in a number of embodiments. For example, as shown in FIG. 4, the operating circuit 401 comprises an encoding unit 402 configured to generate a codeword according to encoding schemes. The codeword may comprise payload data to be stored in a plurality of memory cells of array 400', and parity data associated with the payload data to be stored in parity cells of array 400', wherein a number of parity cells to be used to store the parity data can be selected based on the status of the plurality of memory cells and is related to a corresponding ECC protection level. For instance, the used parity cells can be selected among a minimum number (corresponding to a minimum ECC protection level) and a maximum number (corresponding to a maximum ECC protection level). The codeword may further comprise extra payload data to be stored in unused parity cells.

The operating circuit 401 further comprises a decoding unit 403 configured to perform an ECC operation (such as bit error detection and/or correction) on the stored codeword based on the selected ECC protection level. Therefore, the operating circuit 401 is able to generate a codeword comprising payload data and parity data for multiple ECC protection levels via the encoding unit 402 and to process said codeword via the decoding unit 403, which is configured to handle codewords having a variable payload quantity, as disclosed above.

The encoding unit 402 and the decoding unit 403 may be operatively coupled to each other and to the array 400'. The encoding unit 402 and the decoding unit 403 may be integrated in the controller of the memory device or may be separate components possibly coupled with the controller (and therefore they may not necessarily be integrated in a same component).

The operating circuit 401 may further comprise a logic unit 404 configured to perform logic operations on payload bits and parity bits stored in the array 400'. The logic unit 404 may be operatively coupled to the encoding unit 402 and to the decoding unit 403, as well as to the array 400'.

According to an embodiment of the present disclosure, encoding unit 402 can be configured to generate a codeword for a first ECC protection level and a second ECC protection level. The first ECC protection level can be, for example, a low ECC protection level (e.g., ECC1), and the second ECC protection level can be, for example, a high ECC protection level (e.g., ECC2), as previously described herein. For instance, the first ECC protection level can comprise an ECC correction capability of one data bit, and the second ECC protection level can comprise an ECC correction capability of two data bits.

The codeword can comprise payload data stored in a plurality of memory cells of array 400', and parity data associated with the payload data stored in parity cells of array 400', as previously described herein. For example, the parity data can comprise a first number of parity bits (e.g., $P_0$ described in connection with FIG. 3) stored in a first (e.g., reduced) number of parity cells of the array upon encoding unit 402 generating the codeword for the first ECC protection level, and the parity data can comprise a second number of parity bits (e.g., $P_0$ and $P_1$ described in connection with FIG. 3) stored in a second (e.g., increased) number of parity cells of the array upon encoding unit 402 generating the codeword for the second ECC protection level. Further, in an embodiment, the codeword can comprise additional (e.g., extra) payload data stored in unused parity cells of array 400' upon encoding unit 402 generating the codeword for the first ECC protection level (e.g., the payload can be extended to cover the $P_1$ parity bits described in connection with FIG. 3).

As an example, encoding unit 402 can generate the parity data of the codeword for the first ECC protection level using both payload data stored in a plurality of memory cells of array 400' and additional (e.g., extra) payload data stored in unused parity cells of array 400', and generate the parity data of the codeword for the second ECC protection level using the payload data stored in the plurality of memory cells but not the additional payload data stored in the unused parity cells (e.g., using only the payload data stored in the plurality of cells). Such an example will be further described herein (e.g., in connection with FIG. 5A).

As an additional example, encoding unit 402 can generate both the parity data of the codeword for the first ECC protection level and the parity data of the codeword for the second ECC protection level using both the payload data stored in the plurality of memory cells of array 400' and the additional (e.g., extra) payload data stored in the unused parity cells of array 400' by setting the additional payload data to zero while generating the parity data of the codeword for the second ECC protection level. Such an example will be further described herein (e.g., in connection with FIG. 5B).

As an additional example, encoding unit 402 can generate both the parity data of the codeword for the first ECC protection level and the parity data of the codeword for the second ECC protection level using the payload data stored in the plurality of memory cells of array 400', but not the additional payload data stored in the unused parity cells of array 400'. That is, the parity data of the codeword for the first ECC protection level and the parity data of the codeword for the second ECC protection level can be generated using the same payload data. In such an example, the parity data of the codeword for the first ECC protection level and the parity data of the codeword for the second ECC protection level can comprise the same parity data. Such an example will be further described herein (e.g., in connection with FIG. 5C).

In an embodiment, encoding unit 402 can include a first matrix, a second matrix, and a third matrix (e.g., encoding unit 402 can include three matrices), and can be configured to generate the parity data of the codeword for the first ECC protection level using the first matrix, the second matrix, and the third matrix, and generate the parity data of the codeword for the second ECC protection level using only the first matrix and second matrix. For instance, encoding unit 402 can generate the parity data of the codeword for the first ECC protection level by performing an algebraic operation on the payload data using the first, second and third matrices, and can generate the parity of the data of the codeword for the second ECC protection level by performing an algebraic operation on the payload data using only the first and second matrices. Such an example will be further described herein (e.g., in connection with FIGS. 5A, 5B, and 5C).

In an embodiment, encoding unit 402 can include a first matrix and a second matrix (e.g., encoding unit 402 can include only two matrices), and can be configured to generate the parity data of the codeword for the first ECC protection level using only the first matrix and generate the parity data of the codeword for the second ECC protection level using both the first matrix and the second matrix. Such an example will be further described herein (e.g., in connection with FIG. 5D).

According to an embodiment of the present disclosure, decoding unit 403 can be configured to perform an ECC operation on the codeword generated by encoding unit 402 at the first ECC protection level and at the second ECC protection level. For instance, decoding unit 403 can perform an ECC operation on the codeword at the first ECC protection level upon encoding unit 402 generating the codeword for the first ECC protection level, and decoding unit 403 can perform an ECC operation on the codeword at the second ECC protection level upon encoding unit 402 generating the codeword for the second ECC protection level.

In an embodiment, decoding unit 403 can include a first matrix, a second matrix, and an AND logic gate, and can be configured to perform the ECC operation on the codeword at the first ECC protection level and the second ECC protection level using the first matrix, the second matrix, and the AND logic gate. For example, decoding unit 403 can perform the ECC operation on the codeword at the first ECC protection level by performing algebraic operations on the codeword using the first and second matrices, inputting a result of the algebraic operations into a first input of the AND logic gate, and inputting, into a second input of the AND logic gate, a first input (e.g., 0) indicating to perform the ECC operation at the first ECC protection level. Further, decoding unit 403 can perform the ECC operation on the codeword at the second ECC protection level by performing the algebraic operations on the codeword using the first and second matrices, inputting a result of the algebraic operations into the first input of the AND logic gate, and inputting, into the second input of the AND logic gate, a second input (e.g., 1) indicating to perform the ECC operation at the second ECC protection level. Such an example will be further described herein (e.g., in connection with FIG. 5A).

In an embodiment, decoding unit 403 can include a first matrix, a second matrix, and a multiplexer, and can be configured to perform the ECC operation on the codeword at the first ECC protection level and the second ECC protection level using the first matrix, the second matrix, and the multiplexer. For example, decoding unit 403 can perform the ECC operation on the codeword at the first ECC protection level by performing a first algebraic operation on the codeword using the first matrix and a second algebraic operation on the codeword using the second matrix, performing a cubing operation on (e.g., computing the cube of) a result of the first algebraic operation, inputting a result of the cubing operation into a first input of the multiplexer, inputting a result of the second algebraic operation into a second input of the multiplexer, and inputting a first input (e.g., 0) indicating to perform the ECC operation at the first ECC protection level into a third input of the multiplexer. Further, decoding unit 403 can perform the ECC operation on the codeword at the second ECC protection level by performing the first algebraic operation on the codeword using the first matrix and the second algebraic operation on the codeword using the second matrix, performing the cubing operation on a result of the first algebraic operation, inputting a result of the cubing operation into the first input of the multiplexer, inputting a result of the second algebraic operation into the second input of the multiplexer, and inputting a second input (e.g., 1) indicating to perform the ECC operation at the second ECC protection level into the third input of the multiplexer. Such an example will be further described herein (e.g., in connection with FIG. 5B).

In an embodiment, encoding unit 402 and decoding unit 403 can receive an input (e.g., a data bit) indicating which one of the ECC protection levels (e.g., ECC1 or ECC2) to generate the codeword for and perform the ECC operation at, respectively. Encoding unit 402 can generate the codeword for that ECC protection level responsive to receiving the input, and decoding unit 403 can perform the ECC operation at that ECC protection level responsive to receiving the input. As an example, host 110 described in connection with FIG. 1 can receive a selection of one of the ECC protection levels from a user and send an indication of the selected protection level to memory device 400. As an additional example, operating circuit 401 can determine which one of the ECC protection levels to generate the codeword for and perform the ECC operation at based on the status of the memory cells of array 400', as previously described herein.

FIGS. 5A-5D are schematic block diagrams of various examples of an encoding unit 502 according to an embodiment of the present disclosure. Encoding unit 502 can be, for example, encoding unit 402 previously described in connection with FIG. 4.

Encoding unit 502 can include a first matrix and a second matrix. For instance, in the examples illustrated in FIGS. 5A, 5C, and 5D, encoding unit 502 includes first matrix 551 (e.g., $P_0$) and second matrix 552 (e.g., $P_1$), and in the example illustrated in FIG. 5B, encoding unit 502 includes first matrix 556 (e.g., $P'_0$) and second matrix 557 (e.g., $P'_1$). Matrices 551 and 552 can have dimensions of k×m, and matrices 556 and 557 can have dimensions of (k+m)×m (e.g., first matrices 551 and 556 are different, and second matrices 552 and 557 are different). Definitions for the values of k and m will be further provided herein.

Figure 5A:
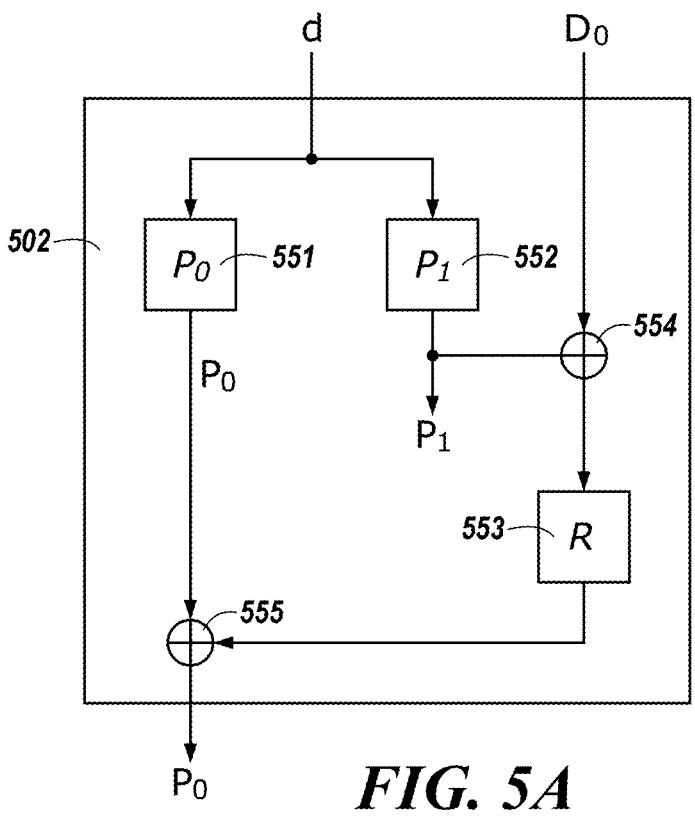
FIGS. 5A-5D are schematic block diagrams of various examples of an encoding unit according to an embodiment of the present disclosure.
Figure 5B:
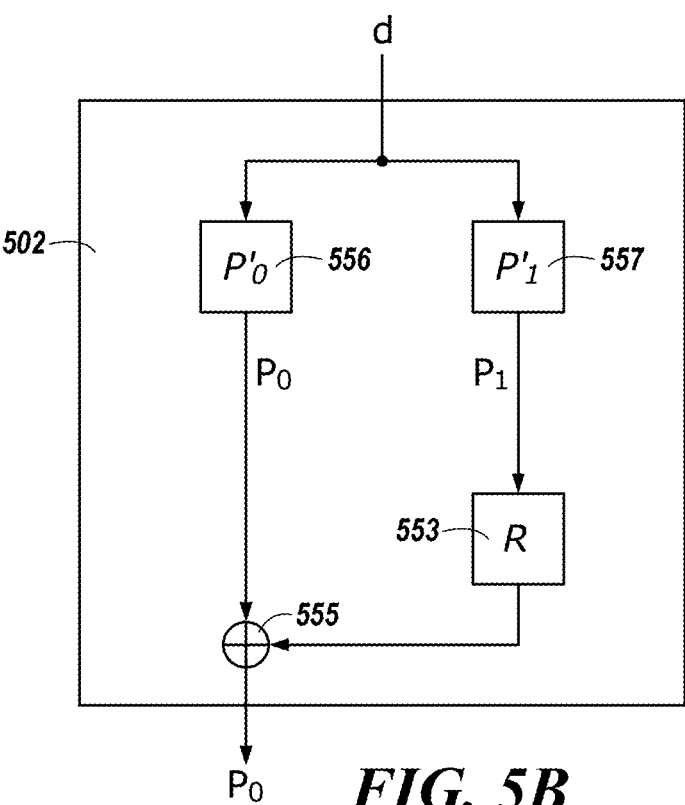
Figure 5C:
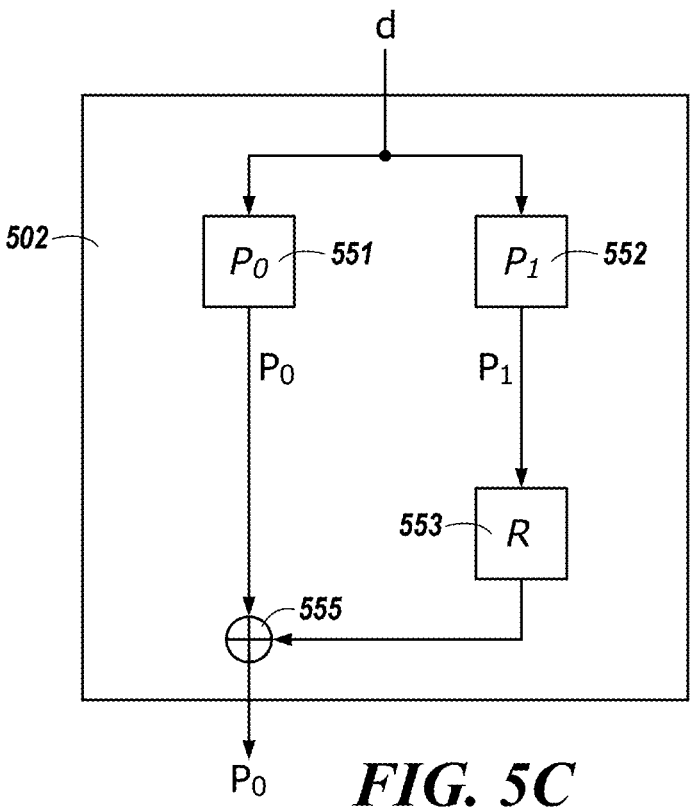

Further, in the examples illustrated in FIGS. 5A, 5B, and 5C, encoding unit 502 can include a third matrix 553 (e.g., R) having dimensions of m×m. However, in the example illustrated in FIG. 5D, encoding unit 502 may include only first and second matrices 551 and 552 (e.g., in this example, encoding unit 502 may not include a third matrix).

As noted above, encoding unit 502 can generate a codeword for a first ECC protection level (e.g., ECC1) and a second ECC protection level (e.g., ECC2). For instance, in the example illustrated in FIG. 5A, when encoding unit 502 is generating a codeword for the second ECC protection level, payload data d having k number of bits is input to encoding unit 502. Encoding unit 502 can generate m bits parity data $P_0$ for the codeword (e.g., $P_0$ described in connection with FIG. 3) by performing an algebraic operation on payload data d using matrix 551, and generate m bits of parity data $P_1$ for the codeword (e.g., $P_1$ described in connection with FIG. 3) by performing the algebraic operation on payload data d using matrix 552, as illustrated in FIG. 5A.

When encoding unit 502 is generating a codeword for the first ECC protection level in the example illustrated in FIG. 5A, the payload data d and additional (e.g., extra) payload data $D_0$ (e.g., $D_0$ previously described in connection with FIG. 3) having m number of bits is input to encoding unit 502. Encoding unit 502 can generate m bits of data $P_0$ by performing the algebraic operation on payload data d using matrix 551, and generate m bits of data $P_1$ by performing the algebraic operation on payload data d using matrix 552, as illustrated in FIG. 5A. Encoding unit 502 can sum (e.g., add) $P_1$ and $D_0$ at operation 554, and perform an algebraic operation (e.g., an XOR operation) on this sum using matrix 553, as illustrated in FIG. 5A. Encoding unit 502 can then sum the result of this algebraic operation and $P_0$ at operation 555 to generate m bits of parity data $P_0$ for the codeword (e.g., $P_0$ described in connection with FIG. 3), as illustrated in FIG. 5A.

In the example illustrated in FIG. 5B, the amount of data in (e.g., the length of) the codeword generated by encoding unit 502 can be the same for both the first ECC protection level and the second ECC protection level. For instance, when encoding unit 502 is generating a codeword for the second ECC protection level, payload data d having k+m number of bits is input to encoding unit 502 (e.g., in the example in FIG. 5B, the payload data d can include the extra payload data $D_0$), with the m bits (e.g., the extra payload data $D_0$) set (e.g., forced) to zero. Encoding unit 502 can generate m bits of parity data $P_0$ for the codeword (e.g., $P_0$ described in connection with FIG. 3) by performing an algebraic operation on payload data d using matrix 556, and generate m bits of parity data $P_1$ for the codeword (e.g., $P_1$ described in connection with FIG. 3) by performing the algebraic operation on payload data d using matrix 557, as illustrated in FIG. 5B.

When encoding unit 502 is generating a codeword for the first ECC protection level in the example illustrated in FIG. 5B, the payload data d is input to encoding unit 502 without forcing the extra payload data $D_0$ to zero. Encoding unit 502 can generate m bits of data $P_0$ by performing the algebraic operation on payload data d using matrix 556, and generate m bits of data $P_1$ by performing the algebraic operation on payload data d using matrix 557, as illustrated in FIG. 5B. Encoding unit 502 can perform an algebraic operation (e.g., an XOR operation) on the $P_1$ data using matrix 553, as illustrated in FIG. 5B. Encoding unit 502 can then sum the result of this algebraic operation and $P_0$ at operation 555 to generate m bits of parity data $P_0$ for the codeword (e.g., $P_0$ described in connection with FIG. 3), as illustrated in FIG. 5B.

In the example illustrated in FIG. 5C, the parity data in the codeword generated by encoding unit 502 can be the same for both the first ECC protection level and the second ECC protection level, and can be generated using the same (e.g. constant) payload data. For instance, when encoding unit 502 is generating a codeword for the second ECC protection level, payload data d having k number of bits is input to encoding unit 502 (e.g., in the example in FIG. 5C, the payload data d does not include the extra payload data $D_0$). Encoding unit 502 can generate m bits of parity data $P_0$ for the codeword (e.g., $P_0$ described in connection with FIG. 3) by performing an algebraic operation on payload data d using matrix 551, and generate m bits of parity data $P_1$ for the codeword (e.g., $P_1$ described in connection with FIG. 3) by performing the algebraic operation on payload data d using matrix 552, as illustrated in FIG. 5C.

When encoding unit 502 is generating a codeword for the first ECC protection level in the example illustrated in FIG. 5C, the same payload data d is input to encoding unit 502. Encoding unit 502 can generate m bits of data $P_0$ by performing the algebraic operation on payload data d using matrix 551, and generate m bits of data $P_1$ by performing the algebraic operation on payload data d using matrix 552, as illustrated in FIG. 5B. Encoding unit 502 can perform an algebraic operation (e.g., an XOR operation) on the $P_1$ data using matrix 553, as illustrated in FIG. 5C, with the values of matrix 553 set to zero. Encoding unit 502 can then sum the result of this algebraic operation and $P_0$ at operation 555 to generate m bits of parity data $P_0$ for the codeword (e.g., $P_0$ described in connection with FIG. 3), as illustrated in FIG. 5C.

Figure 5D:
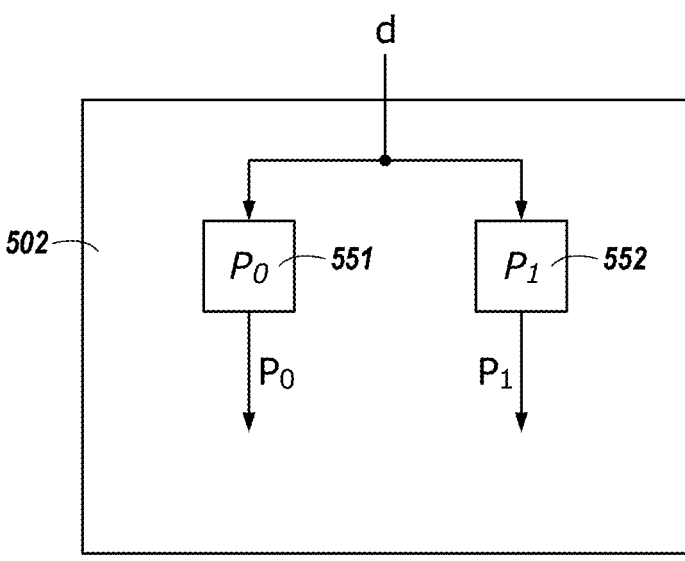

In the example illustrated in FIG. 5D, the parity data in the codeword generated by encoding unit 502 can be the same for both the first ECC protection level and the second ECC protection level, and can be generated using only two matrices (e.g., first matrix 551 and second matrix 552). For instance, payload data d having k number of bits is input to encoding unit 502. When encoding unit 502 is generating a codeword for the second ECC protection level, encoding unit 502 can generate m bits of parity data $P_0$ for the codeword (e.g., $P_0$ described in connection with FIG. 3) by performing an algebraic operation on payload data d using matrix 551, and generate m bits of parity data $P_1$ for the codeword (e.g., $P_1$ described in connection with FIG. 3) by performing the algebraic operation on payload data d using matrix 552, as illustrated in FIG. 5D. When encoding unit 502 is generating a codeword for the first ECC protection level, only the m bits of parity data $P_0$ are generated by performing the algebraic operation on payload data d using only matrix 551.

Figure 6A:
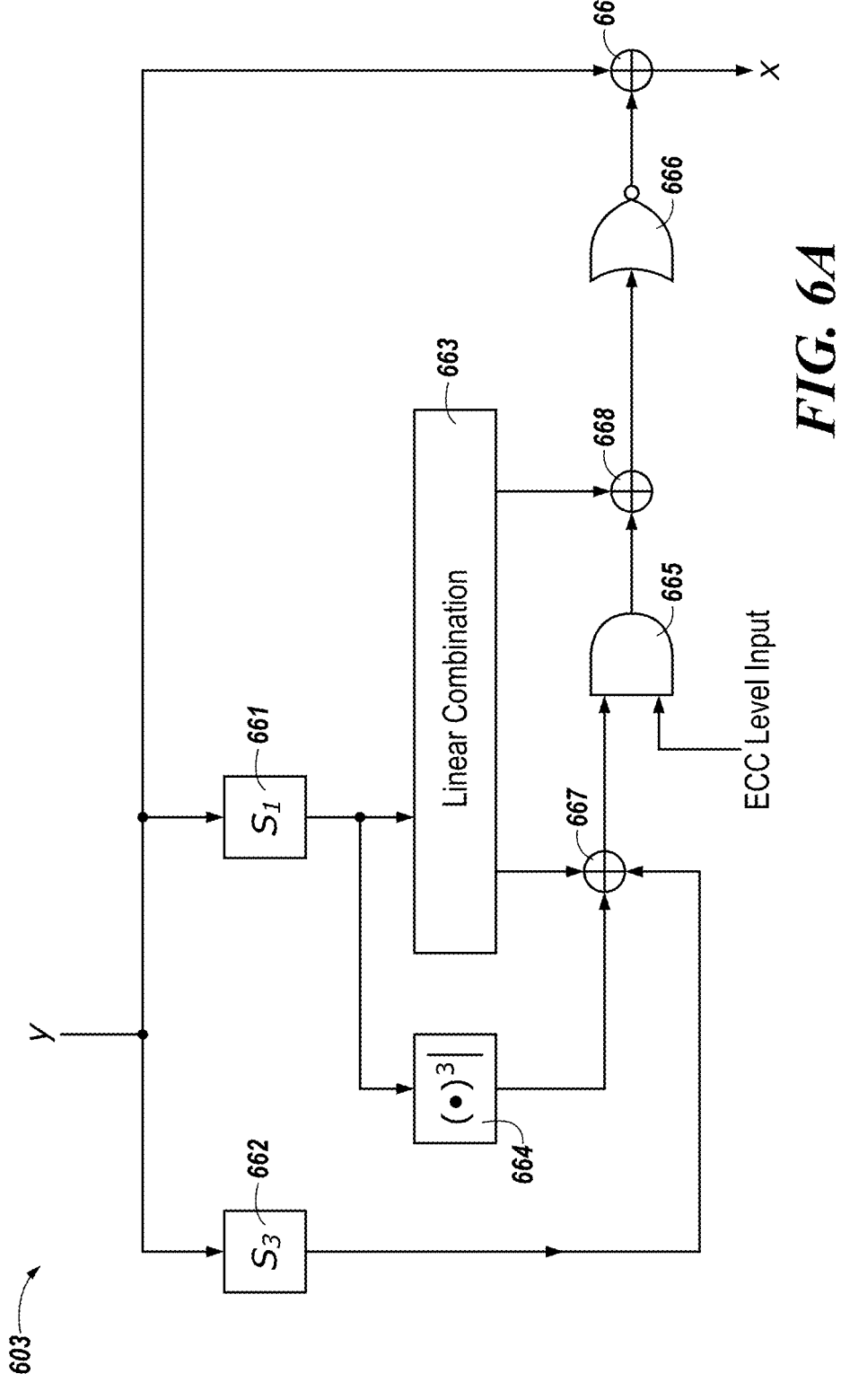
FIGS. 6A-6B are schematic block diagrams of various examples of a decoding unit according to an embodiment of the present disclosure.
Figure 6B:
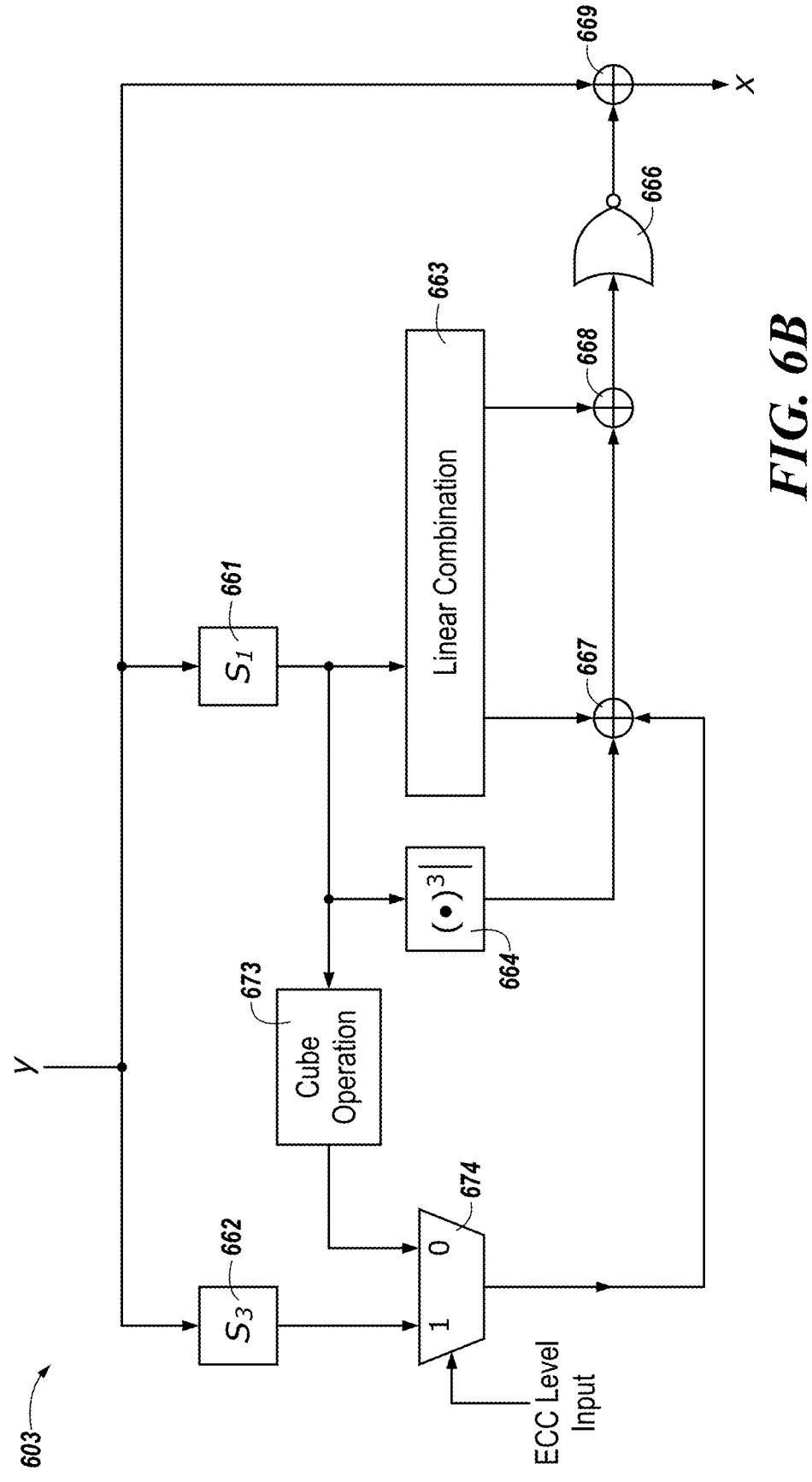

FIGS. 6A-6B are schematic block diagrams of various examples of a decoding unit 603 according to an embodiment of the present disclosure. Decoding unit 603 can be, for example, decoding unit 403 previously described in connection with FIG. 4.

Decoding unit 603 can include a first matrix (e.g., first ECC syndrome) and a second matrix (e.g., second ECC syndrome). For instance, in the examples illustrated in FIGS. 6A and 6B, decoding unit 603 includes first matrix 661 (e.g., $S_1$) and second matrix 662 (e.g., $S_3$). Matrices 661 and 662 can have dimensions of n×m. Decoding unit 603 can also include a linear combination block 663 and a NOR logic gate 666, as illustrated in FIGS. 6A and 6B.

Further, in the example illustrated in FIG. 6A, decoding unit 603 can include an AND logic gate 665. In the example illustrated in FIG. 6B, decoding unit 603 can include cube operation block 673 and multiplexer 674.

As noted above, decoding unit 603 can perform an ECC operation on a codeword (e.g., a codeword generated by encoding unit 502) at a first ECC protection level (e.g., ECC1) and a second ECC protection level (e.g., ECC2). For instance, in the example illustrated in FIG. 6A, a codeword y having 2m+k data bits is input to decoding unit 603. Codeword y can have been generated by encoding unit 502 for the first ECC protection level or the second ECC protection level, as previously described herein.

Decoding unit 603 can perform algebraic operations on codeword y using first matrix 661 and second matrix 662, as illustrated in FIG. 6A. For instance, decoding unit 603 can perform operations associated with the first ECC syndrome $(S_1)$ using matrix 661, and can perform operations associated with the second ECC syndrome $(S_3)$ using matrix 662.

At block 664 illustrated in FIG. 6A, the operation $(\cdot)^3|$ can be performed on the result of the operations performed on the codeword using first matrix 661. The result of the operations performed on the codeword using first matrix 661 can also be input to linear combination block 663, as illustrated in FIG. 6A. Decoding unit 603 can sum the output of linear combination block 663 (which may not include the linear portion of the cube), the result of the operation $(\cdot)^3|$ performed at block 664, and the result of the operations performed on the codeword using second matrix 662, which can each comprise m bits of data, at operation 667, as illustrated in FIG. 6A.

In the example illustrated in FIG. 6A, the sum of operation 667, which can comprise m bits of data, can be input into a first input of AND logic gate 665. Further, an input indicating which ECC protection level (e.g., ECC1 or ECC2) to perform the ECC operation at can be input into a second input of AND logic gate 665, as illustrated in FIG. 6A. For instance, the input can be a single data bit, whose value can be zero if the ECC operation is being performed at the first ECC protection level and whose value can be one if the ECC operation is being performed at the second ECC protection level. The input can be received from host 110 and/or determined by operating circuit 401, as previously described herein.

Decoding unit 603 can sum the output of linear combination block 663 and the output of AND logic gate 665 at operation 668, as illustrated in FIG. 6A. The sum of operation 668, which can comprise m bits of data, can be input into a NOR logic gate 666, as illustrated FIG. 6A. Decoding unit 603 can sum the output of NOR logic gate 666 and the codeword y at operation 669 to generate the corrected codeword x, as illustrated in FIG. 6A.

In the example illustrated in FIG. 6B, a codeword y having 3m+k data bits is input to decoding unit 603. Codeword y can have been generated by encoding unit 502 for the first ECC protection level or the second ECC protection level, as previously described herein.

Decoding unit 603 can perform algebraic operations on codeword y using first matrix 661 and second matrix 662, as illustrated in FIG. 6B. For instance, decoding unit 603 can perform operations associated with the first ECC syndrome $(S_1)$ using matrix 661, and can perform operations associated with the second ECC syndrome $(S_3)$ using matrix 662.

In the example illustrated in FIG. 6B, the result of the operations performed on the codeword using first matrix 661 can be input to cube operation block 673, which can perform a cubing operation on (e.g., compute the cube of) the result of the operations performed on the codeword using first matrix 661. The result of the cubing operation can be input into a first input (e.g., 0) of multiplexer 674, and the result of the operations performed on the codeword using second matrix 662 can be input into a second input (e.g., 1) of multiplexer 674, as illustrated in FIG. 6B. Further, an input indicating which ECC protection level (e.g., ECC1 or ECC2) to perform the ECC operation at can be input into a third input of multiplexer 674, as illustrated in FIG. 6B. For instance, the input can be a single data bit, whose value can be zero if the ECC operation is being performed at the first ECC protection level and whose value can be one if the ECC operation is being performed at the second ECC protection level. The input can be received from host 110 and/or determined by operating circuit 401, as previously described herein.

Further, at block 664 illustrated in FIG. 6B, the operation $(\cdot)^3|$ can be performed on the result of the operations performed on the codeword using first matrix 661. The result of the operations performed on the codeword using first matrix 661 can also be input to linear combination block 663, as illustrated in FIG. 6B. Decoding unit 603 can sum the output of linear combination block 663 (which may not include the linear portion of the cube), the result of the operation $(\cdot)^3|$ performed at block 664, and the output of multiplexer 674, which can each comprise m bits of data, at operation 667, as illustrated in FIG. 6B.

At operation 668 illustrated in FIG. 6B, decoding unit 603 can sum the output of linear combination block 663 and the result (e.g. sum) of operation 667, which can each comprise m bits of data. The sum of operation 668, which can comprise m bits of data, can be input into a NOR logic gate 666, as illustrated FIG. 6B. Decoding unit 603 can sum the output of NOR logic gate 666 and the codeword y at operation 669 to generate the corrected codeword x, as illustrated in FIG. 6B.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure. In addition, as will be appreciated, the proportion and the relative scale of the elements provided in the figures are intended to illustrate the embodiments of the present disclosure and should not be taken in a limiting sense.

As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. A method to operate a memory device, comprising:
performing, by a memory device, an error correction code (ECC) operation on a first codeword at a first ECC protection level; and
performing, by the memory device, an ECC operation on a second codeword at a second ECC protection level by:
performing algebraic operations on the second codeword using a first matrix and a second matrix;
inputting a result of the algebraic operations into a first input of a logic gate; and
inputting, into a second input of the logic gate, an input indicating to perform the ECC operation on the second codeword at the second ECC protection level.

2. The method of claim 1, wherein the first codeword and the second codeword are generated by the memory device.

3. The method of claim 2, wherein the first codeword and the second codeword are generated by an encoding unit of the memory device.

4. The method of claim 1, wherein the ECC operation on the first codeword and the ECC operation on the second codeword are performed by a decoding unit of the memory device.

5. The method of claim 1, wherein the method includes performing the ECC operation on the first codeword at the first ECC protection level by:
performing algebraic operations on the first codeword;
inputting a result of the algebraic operations performed on the first codeword into the first input of the logic gate; and
inputting, into the second input of the logic gate, an input indicating to perform the ECC operation on the first codeword at the first ECC protection level.

6. The method of claim 1, wherein the second ECC protection level comprises an ECC correction capability of two data bits.

7. A memory device, comprising:
an array of memory cells; and
an operating circuit for managing operation of the array, the operating circuit configured to:
generate a codeword for a first error correction code (ECC) protection level and a second ECC protection level; and
perform an ECC operation on the codeword at the first ECC protection level and the second ECC protection level, wherein the operating circuit is configured to perform the ECC operation on the codeword at the first ECC protection level by:
performing algebraic operations on the codeword using a first matrix and a second matrix;
inputting a result of the algebraic operations into a first input of a logic gate; and
inputting, into a second input of the logic gate, an input indicating to perform the ECC operation at the first ECC protection level.

8. The memory device of claim 7, wherein the logic gate is an AND logic gate.

9. The memory device of claim 7, wherein the operating circuit includes the logic gate.

10. The memory device of claim 7, wherein the operating circuit includes the first matrix and the second matrix.

11. The memory device of claim 7, wherein the codeword includes:
payload data stored in a plurality of memory cells of the array; and
parity data associated with the payload data.

12. The memory device of claim 7, wherein the first ECC protection level comprises an ECC correction capability of one data bit.

13. A memory device, comprising:
an array of memory cells; and
an operating circuit for managing operation of the array, the operating circuit including a multiplexer and configured to:
generate a codeword for a first error correction code (ECC) protection level and a second ECC protection level; and
perform an ECC operation on the codeword at the first ECC protection level and the second ECC protection level, wherein the operating circuit is configured to perform the ECC operation on the codeword at the first ECC protection level by:
performing a first algebraic operation on the codeword and a second algebraic operation on the codeword;
performing a cubing operation on a result of the first algebraic operation;
inputting a result of the cubing operation into a first input of the multiplexer;
inputting a result of the second algebraic operation into a second input of the multiplexer; and
inputting, into a third input of the multiplexer, an input indicating to perform the ECC operation at the first ECC protection level.

14. The memory device of claim 13, wherein:
the operating circuit is configured to perform the first algebraic operation on the codeword using a first matrix; and
the operating circuit is configured to perform the second algebraic operation on the codeword using a second matrix.

15. The memory device of claim 13, wherein the operating circuit is configured to perform the ECC operation on the codeword at the second ECC protection level by:
performing a first algebraic operation on the codeword and a second algebraic operation on the codeword;
performing a cubing operation on a result of the first algebraic operation;
inputting a result of the cubing operation into the first input of the multiplexer;
inputting a result of the second algebraic operation into the second input of the multiplexer; and inputting, into the third input of the multiplexer, an input indicating to perform the ECC operation at the second ECC protection level.

16. The memory device of claim 13, wherein the operating circuit is configured to receive an input indicating which one of the first ECC protection level and the second ECC protection level to generate the codeword for.

17. The memory device of claim 16, wherein the operating circuit is configured to receive the input from a host device.

18. The memory device of claim 13, wherein the operating circuit is configured to determine which one of the first ECC protection level and the second ECC protection level to generate the codeword for.

\* \* \* \* \*